Dec. 19, 1933.  G. T. HARCOURT  1,940,087
POWER APPARATUS
Filed May 23, 1929  4 Sheets-Sheet 1

INVENTOR.
George T. Harcourt
BY
Ira L. Nickerson
ATTORNEY.

INVENTOR.
George T. Harcourt
BY
Ira L. Nickerson
ATTORNEY

Patented Dec. 19, 1933

1,940,087

UNITED STATES PATENT OFFICE 1,940,087

POWER APPARATUS

George T. Harcourt, Detroit, Mich., assignor to Chicago Pneumatic Tool Company, New York, N. Y., a corporation of New Jersey Application May 23, 1929. Serial No. 365,535

21 Claims. (Cl. 74—14)

This invention relates to power apparatus having broad application to power work which involves pressure as in pushing or compressing, or reverse action as in drawing and pulling, or both movements. While of general application the invention has been particularly developed in relation to small or portable machines, especially hand machines which are of small size and light weight but effect a great multiplication of the power initially applied.

One object of the invention is to effect the combination of a quick travel movement of the working plunger having a minimum application of power with a slow travel movement of the same having a maximum power action. Another object is to provide apparatus which is essentially simple both in construction and operation, and inexpensive to build and assemble. Another object is to effect a better application of power. Still another object is to reduce to a minimum the waste travel of the primary power means. Another object is to utilize a minimum of moving parts. Still another object is to provide improved means for regulating and controlling the speed and manner of movement of the working plunger and the degree and extent of the ultimate force applied to the work. Still another object is to improve the control means for the primary power mechanism. Still other objects will be apparent from the detailed description which follows.

The invention involves primary power mechanism, a working plunger, and intervening means for apportioning the operation of the primary mechanism between mere movement of the plunger into contact with work and the actual application of power. By preference the intervening means take the form of a lever generally triangular in shape with the apex in contact with the working plunger, one base end attached to the primary power mechanism and the other base end floating. The guide means for the floating end of the lever determine the effect upon the working plunger of the application of the primary force to the other base end. The guide means may take the form of a guide block and the configuration of the guiding surfaces thereon apportion the amount of the primary power which is utilized for mere waste movement of the working plunger (necessary to bring it into contact with the work), and determines the speed of application and extent of ultimate multiplied power expended in actual work. The guiding surfaces for producing the desired effects may be angularly disposed relative to one another and may comprise a series, if "dwells" of the working plunger are desired during one full movement of the same in one direction. By providing opposed guiding surfaces on the guide block the plunger may be arranged to perform work in both directions of movement. The invention further involves an improved method and means of manual control whereby a single operating member not only actuates the main control but the reversing control as well for the primary power means.

In order to illustrate the invention concrete embodiments thereof are shown in the accompanying drawings, in which.

Figure 1:
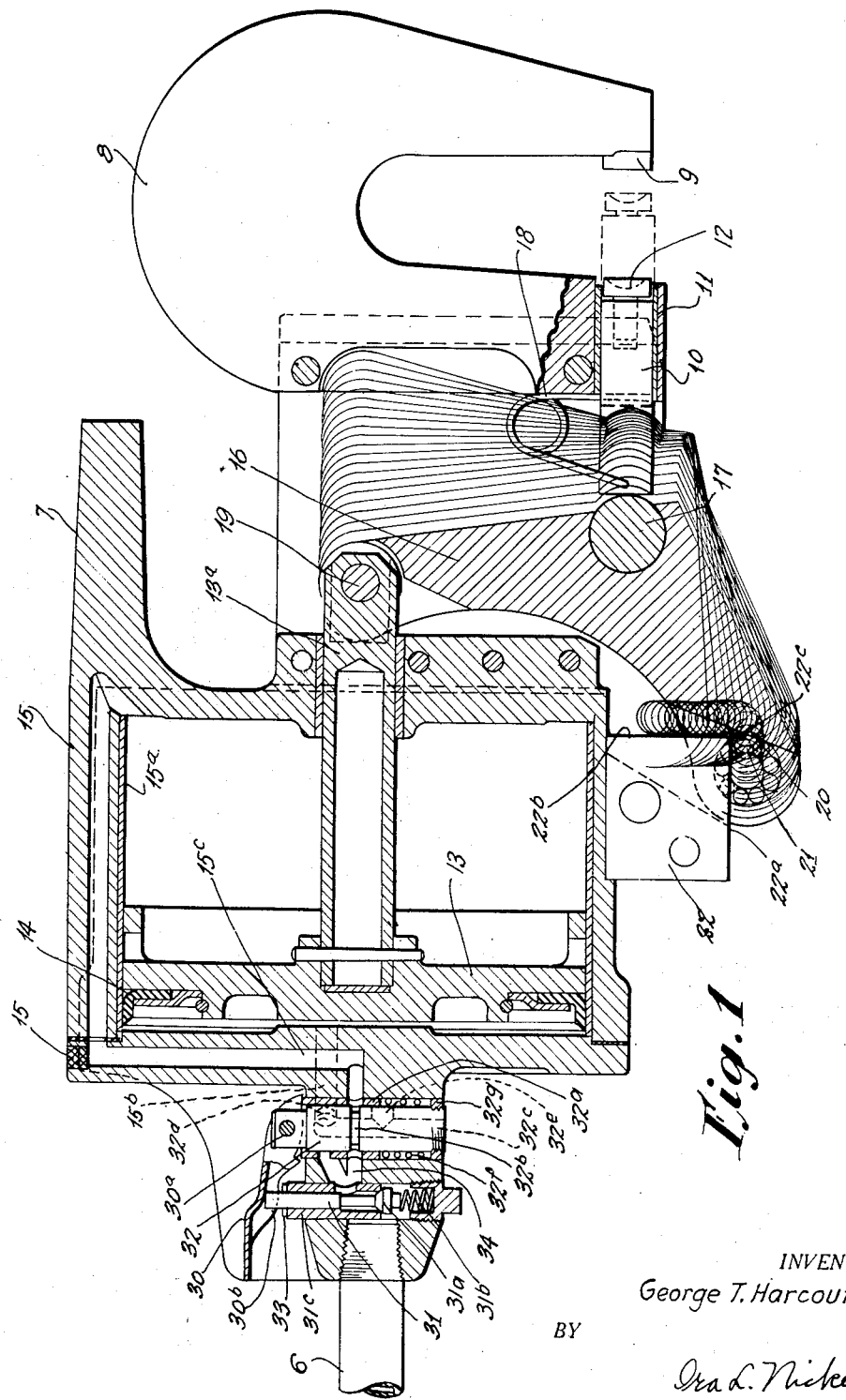
Fig. 1 is a sectional view, with certain parts in elevation, of an adaptation of the invention to squeeze riveting, the primary power piston being in its retracted position.

The compression riveting machine shown in Fig. 1 is intended for heading cold rivets of alloy steel or duralumin which require a very heavy pressure securely to clamp metal sheets or plates in engagement and to form a proper head upon the rivet. The tool shown is of the small hand type provided with handles 6 and 7, a yoke 8 for engagement with the work having an anvil 9, and in line with the latter a working plunger 10 for reciprocatory movement within a bushing 11 in the yoke. Plunger 10 carries a replaceable abutment, rivet set, punch, or other working tool 12.

For the primary power means any suitable or desired motor may be used. In the present instance, the motor is of the fluid pressure type operated by compressed air which enters through handle 6 and is arranged to reciprocate a piston 13 provided with suitable packing means 14 within a cylinder 15 from which handle 7 extends. The piston chamber of the cylinder may be provided with a renewable lining or bushing 15a. Piston 13 has a rod or plunger 13a which projects beyond cylinder 15 and reciprocates with the piston axially of the tool toward and from yoke 8. Working plunger 10 is offset relative to power plunger 13a and may be angularly disposed relative thereto but is shown in parallelism therewith.

The operating connection between power plunger 13a and working plunger 10 comprises a lever 16 which is generally triangular in shape, as indicated. The apex of the lever engages plunger 10 and is provided with a renewable bearing member 17 for direct contact with the plunger. Resilient means such as a spring 18 acting on plunger 10 yieldingly urges the same to retracted position and maintains it in contact with bearing member 17. One of the base ends of lever 16 is pivotally connected to the projecting end of power plunger 13a as by a pivot pin 19. The other base end of the lever is provided with a frictionless bearing 20 supporting a roller 21 which engages a guide block 22 secured to cylinder 15.

The configuration of the surfaces of guide block 22 engaged by roller 21 determines the character of movement of working plunger 10 and the ratio of effective power applied thereby.

In the form shown in Fig. 1, the guide block has a guiding surface 22a in substantial parallelism with a power plunger 13a and a second guiding surface 22b at a right angle thereto. Surface 22a causes fast advancing movement of plunger 10, for as pressure fluid is admitted to the rear of primary piston 13 the piston moves forwardly along with plunger 13a and lever 16 since roller 21 is then being guided along the horizontal guide surface 22a and the latter is parallel with the center line of the power plunger travel. Thus the movement of these parts is at the speed of piston 9. This portion of the movement brings abutment 12 up to the work. Roller 21 has then reached point 22c and as it begins to move along surface 22b, lever 16 swings on its pivot 19 producing a wedging action between working plunger 10 and guide surface 22b with steadily increasing leverage and multiplication of power until roller 21 reaches the center line or axis of working plunger 10. On reversing the fluid pressure motor, piston 13 and power plunger 13a move rearwardly, roller 21 retracing its movement along guide surface 22b around corner 22c and then along surface 22a to its full line position, working plunger 10 meantime being retracted and maintained in contact with bearing member 17 by spring 18. With this arrangement, the advancing of working plunger 10 to engagement with the work is rapid, without multiplication of power, and consumes only a fraction of the movement of primary piston 13 as clearly indicated by the successive position lines on the drawings. During the transverse movement of roller 21 on guide surface 22b, the movement of plunger 10 is much slower but increases in power by reason of the wedging action referred to above.

Figure 2:
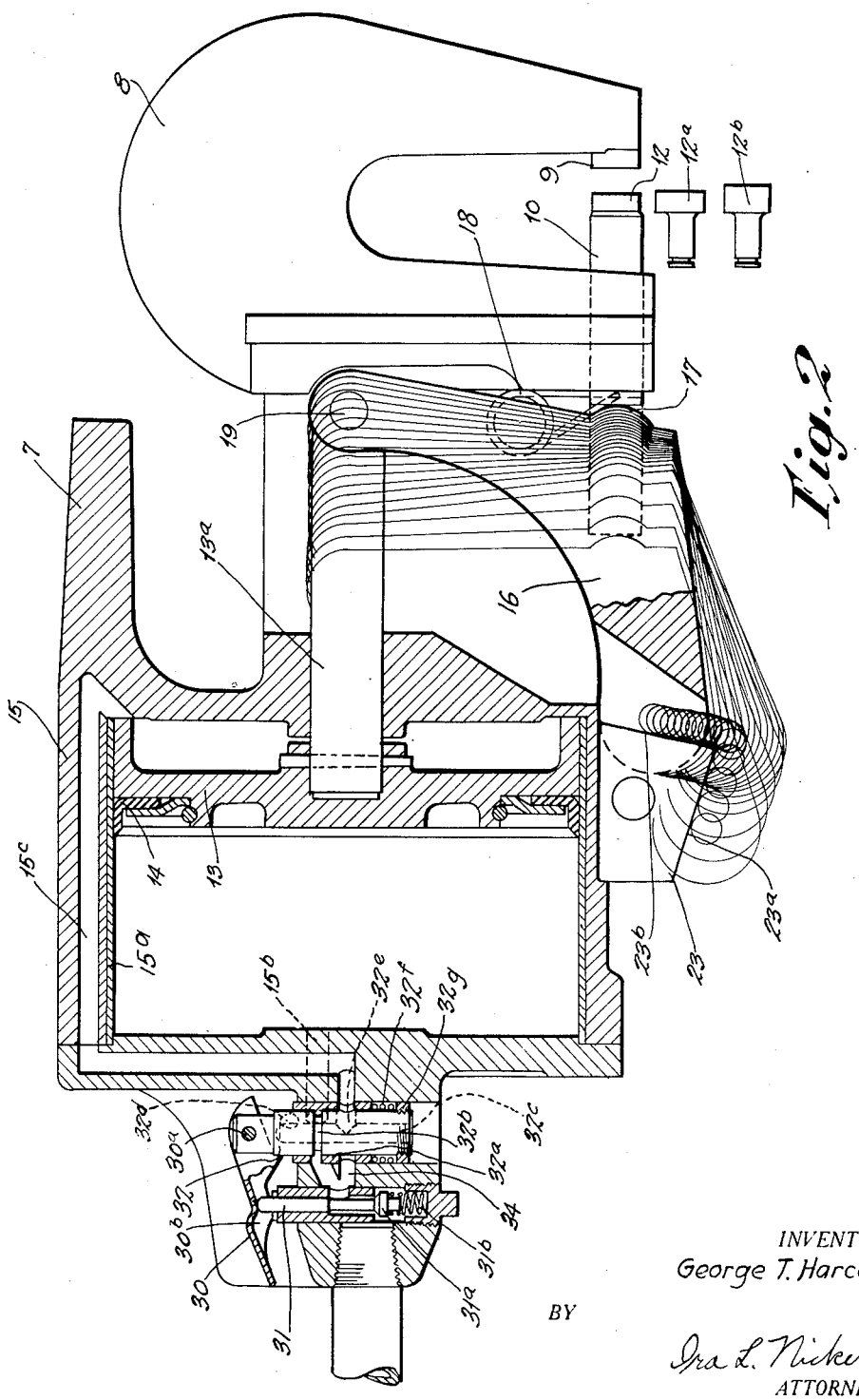
Fig. 2 is a view, similar to Fig. 1, of the same machine with a modified form of guide block and showing the primary power piston in its extended position.

Fig. 2 shows a machine similar in all respects to that disclosed in Fig. 1 and having similar parts indicated by the same reference characters with the exception of the guide block 23. This guide block has angularly disposed guide surfaces 23a and 23b which form an acute angle, rather than a right angle as in Fig. 1, and are each oblique to the longitudinal and transverse axes, respectively, of the tool. The net result of this guide arrangement is to effect a longer throw or movement of working plunger 10 than was possible with the guide arrangement shown in Fig. 1, and the stages of movement—both without multiplication of power and with increase in power—are greater than in the Fig. 1 arrangement.

To adapt the tool shown in Figs. 1 and 2 to work of varying thickness, a series of replaceable abutments, rivet sets, or other working tools 12, 12a, and 12b, are provided having heads which vary in thickness (Fig. 2).

Figure 3:
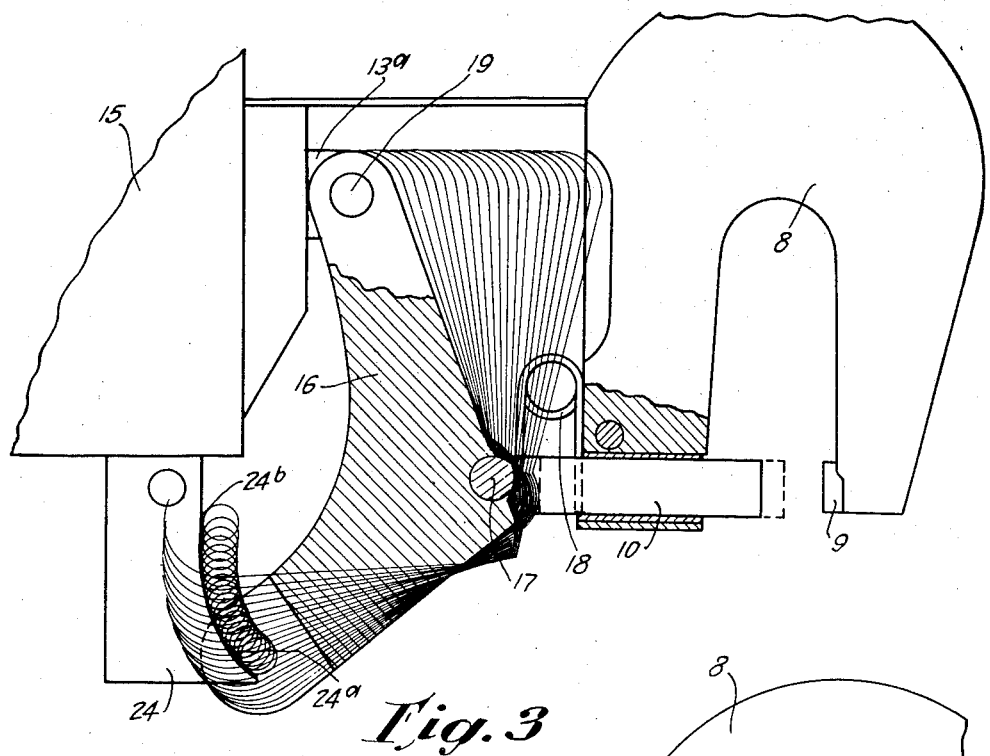
Fig. 3 is a fragmentary sectional view showing still another form of guide member for effecting uniform movement of the working plunger.

In the form of the invention shown in Fig. 3, the movement of working plunger 10 is made very short and absolutely regular as to the steps thereof. In this instance, guide block 24 has an initial curved guide surface 24a which is convex relative to working plunger 10 and merges smoothly into a straight guide surface 24b which is transverse to the axis of the tool.

Figure 4:
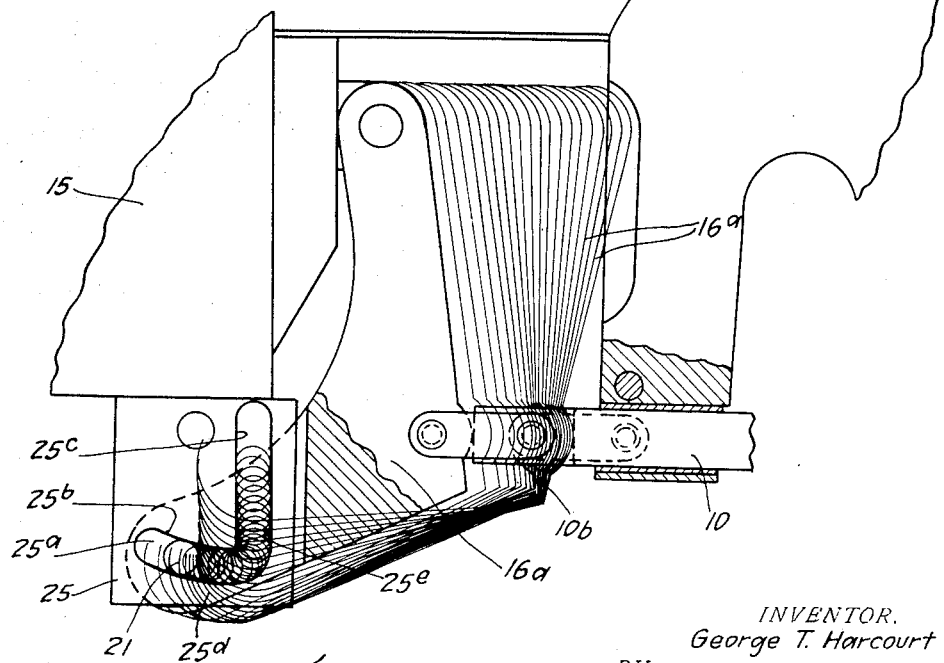
Fig. 4 is a fragmentary sectional view showing still another guide arrangement which adapts the working plunger to perform work in both directions of movement.

In Fig. 4, the machine is shown with a guide arrangement which adapts it for performing work in both directions of movement of the working plunger 10a which is, in this case, directly connected to the lever 16a as by a link 10b. Guide block 25 is formed with a groove or slot 25a which receives roller 21. For pressure operation, as in riveting, groove 25a provides guide surfaces 25b and 25c, while for pulling movement, as in withdrawing spikes from railway ties, groove 25a provides guide surfaces 25d and 25e. The opposed guide surfaces formed by groove 25a need not be in parallelism but are of the appropriate configuration and inclination to effect the desired movement of plunger 10a. In the operation of this machine it will be noted that for riveting the movement of the plunger 10a conforms to that of the machine shown in Figs. 1 and 2, namely a rapid advance movement without pressure multiplication followed by a much slower movement with continued increase of power. In using the machine for withdrawing or pulling, the slow movement with much multiplication of power is initially effected by guide surface 25e, the power decreasing and the speed of movement increasing as the spike or other securing member is loosened and, as the guide roller 21 swings into contact with guide surface 25d the withdrawing movement becomes very rapid.

Figure 5:
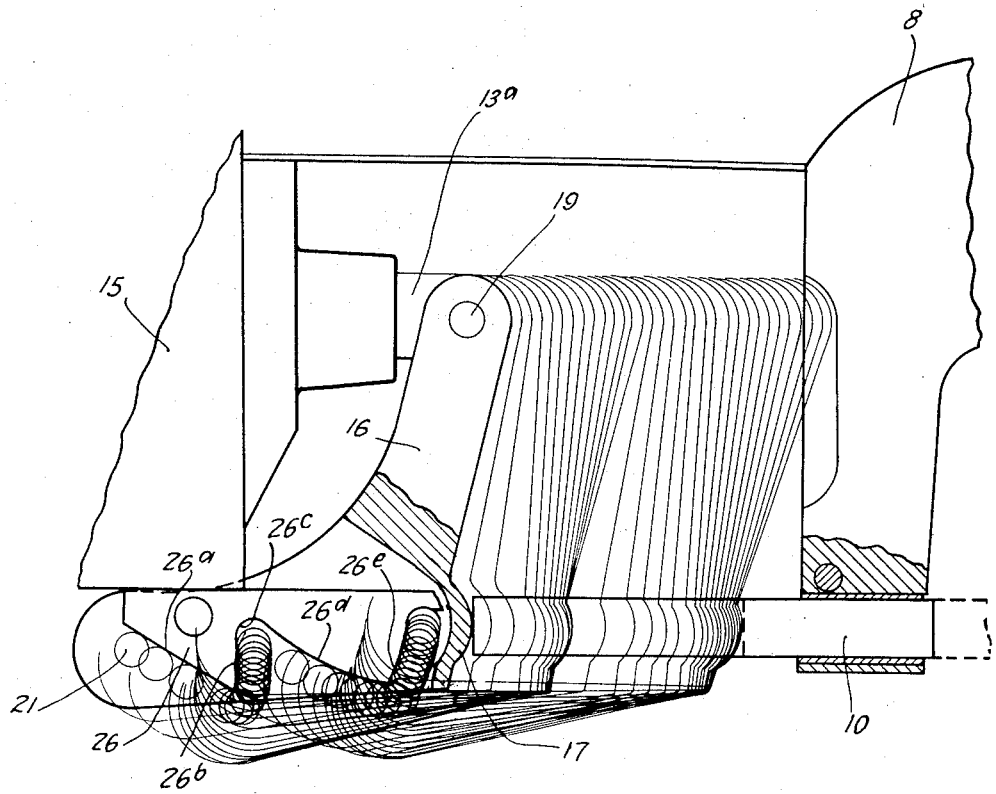
Fig. 5 shows still another form of guide arrangement in which a "dwell" is effected during the advancing movement of the working plunger.

In the form of the invention shown in Fig. 5, the guiding means is arranged to effect two or more of the cycles of operation of any of the preceding means with intervening "dwells" without shutting off the primary power means. To this end guide block 26 has guiding surfaces for quick movement and power movement arranged in multiples or in series, the guide surfaces being engaged by the lever roller 21 in succession. For the initial rapid advancing movement, guide roller 21 moves along guide surface 26a and then turns at an angle along guide surface 26b for the power movement, a "dwell" being effected at point 26c. The roller then engages guiding surfaces 26d for a second stage of rapid movement and then swings inwardly along the power guiding surface 26e for a second step or stage of power operation. As many series of pairs of guiding surfaces may be utilized as required and as indicated in this figure the configuration and angular inclination relative to one another and to the longitudinal and transverse axis of the tool may be varied as desired to produce the requisite effect. This arrangement also shows how the working plunger 10 can be stopped and started again without stopping the movement of the primary motor or power means. The "dwelling" action thus obtained is important when a locating pin has to be withdrawn or a piece inserted at a definite time during the operation. As in all of the previously described forms, any change in the guiding surfaces for roller 21 produces a corresponding change in the travel of the working plunger.

The invention also involves novel control means for the primary power motor. Referring now to Figs. 1 and 2, it is noted that a single manual control lever 30 is provided for actuating both the main control 31 and the reversing control 32. In the event of the use of an electric motor for the primary power means, controls 31 and 32 would be switches but, inasmuch as the motor shown is of the fluid pressure type, control 31 includes throttle valve 31a which is yieldingly urged to its seat by a spring 31b while reversing control 32 consists of a valve reciprocable in a bushing 32a and provided on its exterior with a groove 32b and with an axially extending bore 32c provided with ports 32d and 32e for registration in alternation with a port 15b leading to the rear end of the piston chamber and with the passage 15c leading to the forward end thereof. A coil spring 32f seated against bushing 32a engages a threaded collar 32g on valve 32 yieldingly to maintain the valve in its lowermost position as indicated in Fig. 1. Lever 30 is pivotally connected to valve 32 as by a pivot pin 30a and has a fulcrum portion 30b arranged to engage a washer 33 upon the top of guide bushing 31c for throttle control 31.

Normally, the control lever and the valves are in the positions shown in Fig. 1, throttle valve 31a being closed and groove 32b establishing communication between one of the branches of inlet port 34 and passage 15c leading to the forward end of the piston chamber. The rear end of the piston chamber is vented to atmosphere through ports 15b, 32d, and vent bore 32c. To operate the control valve to move piston 13 forwardly, the operator presses down hard upon lever 30 and such movement of lever 30 opens throttle valve 31a and causes the fulcrum portion 30b of the lever to engage washer 33 whereupon pivot pin 30a lifts reversing valve 32 to the position shown in Fig. 2 whereupon the upper branch of inlet 34 is connected by groove 32b to port 15b opening into the rear end of the piston chamber, the forward end of which is vented to atmosphere through passage 15c, port 32e, and vent bore 32c. To effect reverse movement of the piston, the operator releases the pressure on lever 30 sufficiently to permit spring 32f to move valve 32 to its lowermost position (Fig. 1) but still maintains sufficient pressure on the lever to hold the fulcrum 30b in contact with washer 33, for thus throttle valve 31 is held open. Release of all pressure on lever 30 permits the closing of throttle valve 31a by spring 31b and restores all the parts to the position shown in Fig. 1.

The invention herein disclosed has been found to be eminently practical for the heading of cold rivets in the assembly of aeroplane, automobile, and machine parts, and for many other operations, due particularly to the cycle of operation and the ease with which the character and extent of movement and ultimate power output may be modified. In driving a cold rivet the resistance offered by the rivet is not uniform. At the start not much pressure is required to upset the rivet but as the rivet is expanded to fill up the rivet hole and the plates are being clamped together by the rivet more and more pressure is required. This requirement of a continued increase in effective pressure is very evident from the fact that when a riveting machine is trying to handle a rivet which is a little larger than its capacity, the rivet will be upset or headed but will not clamp the plates together. The present invention provides a riveter which will apply this increasing pressure to the extent and in the manner desired for the best work, and this is accomplished without the use of the conventional cam guide (which is difficult to machine) or complicated toggle arrangements. Guiding surfaces on the guide blocks herein disclosed are easily machined without the use of special apparatus and the guide blocks may be arranged to be interchanged to adapt a riveter to work of varying character. With guiding surfaces arranged as in Figs. 1 and 2, only a fraction of the movement of the primary power means (20% or less) is needed for bringing the working tool into contact with the work and the remaining 80% or more is thereupon available for the work itself, with any desired ratio of continuous and increasing multiplication of power. The very simplicity of the guiding means results in the use of few parts of rugged construction and a consequently highly efficient and long lived machine.

While the invention has been herein disclosed in what are now considered to be preferred forms thereof, it is to be understood that the invention is not limited to the specific details thereof but covers all changes, modifications, and adaptations, within the scope of the appended claims.

I claim as my invention:

1. A power machine having a reciprocable primary power plunger, a working plunger in substantial parallelism therewith, and a single member between said plungers operating as a lever to push the working plunger and having a movable fulcrum beyond both plungers.

2. A power machine having a reciprocable primary power plunger, a working plunger, a substantially triangular lever having its apex in engagement with said working plunger, a pivotal connection between one base end of said lever and said power plunger, and fulcrum means engaged by the other base end of said lever.

3. A power machine having a reciprocable primary power plunger, a working plunger, a substantially triangular lever having its apex in engagement with said working plunger, a pivotal connection between one base end of said lever and said power plunger, and fulcrum means having a guide surface slidably engaged by a portion of said lever for determining the character and the extent of movement of said working plunger.

4. A power machine having a reciprocable primary power plunger, a working plunger, a lever having a pivotal connection with said power plunger, a pressure part for engagement with said working plunger and a fulcrum part, and interchangeable means for slidable engagement by said fulcrum part of said lever for determining the speed of movement and the multiplication of pressure exerted upon said working plunger.

5. A power machine having a reciprocable primary power plunger, a working plunger, a lever having a pivotal connection with said power plunger, a pressure part for engagement with said working plunger and a fulcrum part, and guide means for said fulcrum part arranged to utilize only a fraction of the movement of said power plunger for quick movement of said working plunger and the remainder of the movement of said power plunger for slower movement of said working plunger with multiplication of power.

6. A power machine having a reciprocable primary power plunger, a working plunger, a lever having a pivotal connection with said power plunger, a pressure part for engagement with said working plunger and a fulcrum part, and guide means for said fulcrum part arranged to utilize only 20% or less for the movement of said power plunger for quick advance of said working plunger to the work and the remainder of the movement of said power plunger for applying a steadily increasing pressure to said working plunger.

7. In power applying apparatus, a working plunger, a lever having means intermediate its ends for engagement with said plunger, means for applying primary power movement to one end of said lever, and means causing angular movement of the other end of said lever, said lever being adapted to exert a pushing force upon the working plunger.

8. In power applying apparatus, a working plunger, a lever having means intermediate its ends for engagement with said plunger, means for applying primary power movement to one end of said lever, and means providing guide surfaces substantially at right angles to one another for sliding engagement by the other end of said lever.

9. In power applying apparatus, a working plunger, a lever having means intermediate its ends for engagement with said plunger, means for applying primary power movement to one end of said lever, slide bearing means on the other end of said lever, and means providing a guide surface for said bearing means to effect relatively rapid movement of said plunger and another guide surface for effecting a slower but increasingly more powerful movement of the same.

10. In power applying apparatus, a working plunger, a lever having means intermediate its ends for engagement with said plunger, means for applying primary power movement to one end of said lever, and means providing guide surfaces slidably engaged by the other end of said lever, one surface for effecting rapid advance of the plunger with but slight application of power and another surface for effecting progressively slower movement of said plunger with progressively greater power until a maximum application of power is attained.

11. In power applying apparatus, a reciprocable working plunger, a lever substantially triangular in shape having its apex engaging said plunger, a primary power plunger reciprocable in a straight line and having a pivotal connection with one base end of said lever, a slide bearing on the other base end of said lever, and means providing one guide surface for said bearing end for effecting movement of the same substantially in the direction of movement of said working plunger and another guide surface for movement of said bearing end in a transverse direction.

12. In power applying apparatus, a reciprocable working plunger, a lever substantially triangular in shape having its apex engaging said plunger, a primary power plunger reciprocable in a straight line and having a pivotal connection with one base end of said lever, a slide bearing on the other base end of said lever, and guide means for said bearing end for effecting a "dwell" in the advancing movement of said working plunger.

13. A power machine having a reciprocable primary power plunger, a working plunger, a substantially triangular lever having its apex in engagement with said working plunger, a pivotal connection between one base end of said lever and said power plunger, and a guide block having guide surfaces substantially at right angles to one another for slidable engagement by the other end of said lever.

14. A power machine having a reciprocable primary power plunger, a working plunger, a substantially triangular lever having its apex in engagement with said working plunger, a pivotal connection between one base end of said lever and said power plunger, and a guide block having a series of angularly disposed guide surfaces for slidable engagement by the other end of said lever for effecting a "dwell" during the movement of said working plunger.

15. A power machine for setting or removing securing members comprising a power plunger, a working plunger in substantial parallelism with said power plunger, a fulcrum member in substantial alignment with said working plunger, and a single member engaging both plungers and said member and movable in at least two directions relative to said fulcrum member.

16. A power tool comprising a cylinder, a piston reciprocable within said cylinder and having a plunger projecting therefrom, said plunger being reciprocable in a straight line, a work-engaging member, a working plunger mounted upon said member, a guide block on said cylinder, and a lever pivoted to said piston plunger and engaging both said first-named plunger and said guide block.

17. A power tool comprising a cylinder, a piston reciprocable within said cylinder and having a plunger projecting therefrom, a guide block removably secured to said cylinder, a work-engaging yoke, a working plunger slidably mounted on said yoke in substantial alignment with said block, a lever generally triangular in form with its apex engaging said working plunger, one end pivoted to said piston plunger and the other end having a frictionless bearing engaging said guide block.

18. A power tool comprising a cylinder a piston reciprocable within said cylinder and having a plunger projecting therefrom, a guide block having a series of angularly disposed surfaces removably secured to the exterior of said cylinder, a work-engaging yoke, a working plunger slidably mounted on said yoke in substantial alignment with said block, a lever generally triangular in form with its apex engaging said working plunger, one end pivoted to said piston plunger and the other end having a frictionless bearing engaging said guide surfaces on said block.

19. A power machine comprising a primary power plunger, a working plunger, a lever actuated by the power plunger, said lever having a movable fulcrum and being adapted to move the working plunger positively in two directions.

20. In a power applying apparatus a working plunger, a lever having means intermediate its ends for engagement with said plunger, means for applying primary power movement to one end of said lever, and a stationary guide having a pin and slot connection with the other end of the lever, the slot forming said connection being of curved shape.

21. In power multiplying apparatus, in combination, a primary power plunger reciprocable in a straight line, a working plunger, and a single member interconnecting said plungers and having a movable fulcrum, said member being adapted to move the working plunger positively in two directions.

GEORGE T. HARCOURT.